United States Patent [19]

Wacker

[11] Patent Number: 5,995,192
[45] Date of Patent: *Nov. 30, 1999

[54] METHOD AND APPARATUS FOR COPYING PHOTOGRAPHIC ORIGINALS ONTO SINGLE-SHEET COPY MATERIAL

[75] Inventor: Rudolf Wacker, Rombach, Sweden

[73] Assignee: Gretag Imaging AG, Regensdorf, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 08/921,375

[22] Filed: Aug. 29, 1997

[30] Foreign Application Priority Data

Sep. 9, 1996 [EP] European Pat. Off. ............. 96810593

[51] Int. Cl.[6] .......................... G03B 27/00; G03B 27/32; G03B 27/52
[52] U.S. Cl. .................................. 355/18; 355/27; 355/40
[58] Field of Search .................................. 355/18, 26, 27, 355/46, 50, 64, 72; 396/569, 578; 399/357

[56] References Cited

U.S. PATENT DOCUMENTS

| | | | |
|---|---|---|---|
| 4,389,117 | 6/1983 | Floyd et al. ............................... | 355/87 |
| 4,779,112 | 10/1988 | Thor ........................................ | 354/174 |
| 4,916,479 | 4/1990 | Ujiie .......................................... | 355/28 |
| 5,186,449 | 2/1993 | Ohmi et al. ............................... | 271/10 |
| 5,278,599 | 1/1994 | Musch et al. ............................ | 354/173 |
| 5,281,991 | 1/1994 | Oonishi et al. ........................... | 355/29 |
| 5,323,220 | 6/1994 | Yasuda .................................... | 355/317 |
| 5,335,045 | 8/1994 | Kunz et al. ............................... | 355/72 |
| 5,594,525 | 1/1997 | Benker et al. ............................ | 355/29 |
| 5,669,031 | 9/1997 | Ishikawa et al. ........................ | 396/569 |
| 5,703,674 | 12/1997 | Nishio ...................................... | 355/46 |
| 5,758,246 | 5/1998 | Miyake .................................... | 399/375 |

FOREIGN PATENT DOCUMENTS

0 570 651A1 5/1992 European Pat. Off. .

*Primary Examiner*—Safet Metjahic
*Assistant Examiner*—Hung Henry Nguyen
*Attorney, Agent, or Firm*—Burns, Doane, Swecker & Mathis, L.L.P.

[57] ABSTRACT

In a method for copying originals onto photographic single-sheet copy material, the original is scanned, and on the basis of the scanning values obtained the requisite quantities of copying light for the ensuing copying of the original onto the single-sheet copy material are ascertained. First, the unexposed single-sheet copy material is transported into the exposure beam path, then acted upon by the quantities of copying light ascertained previously, and finally removed for further processing. During the removal of the exposed single-sheet copy material, the next piece of unexposed single-sheet copy material is being transported into the exposure beam path.

6 Claims, 2 Drawing Sheets

METHOD AND APPARATUS FOR COPYING PHOTOGRAPHIC ORIGINALS ONTO SINGLE-SHEET COPY MATERIAL

BACKGROUND OF THE INVENTION

1. Field of the Invention

The invention relates to a method and an apparatus for copying photographic originals onto single-sheet copy material.

2. State of the Art

Numerous methods of photographic copying using printers are known. In a frequent application, the frames of a negative film are copied onto photo paper. In terms of the equipment, a fundamental distinction is made between so-called high-speed printers (or high-speed lines) which produce only the most frequently used sizes of paper prints in very large numbers, and so-called minilabs whose primary field of application is the production of particular sizes of paper prints. Minilabs are also suitable for smaller or medium numbers of formats that occur quite often.

In professional photography, the formats or sizes desired are often variable, so that it is not expedient in practice to use minilabs to process striplike copy material (i.e. photo paper that comes on rolls). When minilabs are used, single-sheet copy material is typically used, i.e., photo paper in individual sheets. The individual sheets correspond in their dimensions to the desired format of the paper print. Since, as a rule, the negatives all have the same dimensions, the scale of projection is altered in the enlargement operation to achieve the desired size of paper print.

In a minilab, the negative to be copied is scanned (with a scanner) and the requisite quantities of copying light are ascertained with the aid of the scanning values obtained. Once the requisite quantities of copying light have been ascertained, the negative to be copied is guided on a film stage into the exposure beam path, and the requisite projection scale is adjusted. At the same time, the unexposed sheet of photo paper of the desired format is transported on a paper stage, also into the exposure beam path. This operation is performed without exposing the photo paper to copying light (for example, the light of the copying lamp is blocked with a baffle). If the negative to be copied and the sheet of photo paper have reached the appropriate copying position, the blocking unit is removed and the negative is copied onto the photo paper using the previously ascertained quantities of copying light. Next, the light coming from the copying lamp is blocked again, and the exposed photo paper is removed from the paper stage and processed further.

The operation described above is such that a sheet of photo paper is transported on the paper stage, (i.e., exposing stage) the negative is copied onto the photo paper and then the exposed photo paper is removed from the paper stage. Once this operation is concluded, the next sheet of photo paper is transported onto the paper stage, the corresponding negative is copied and the exposed photo paper is removed from the paper stage, and so forth. Only one sheet of paper is thus ever located on the paper stage at any given time. In a printer intended for producing copies of only a small number of formats, and in which the paper stage is well utilized even with the small formats, this kind of procedure is acceptable. However, if a great many different formats are to be processed, the utilization of the paper stage, especially for the small formats, is quite poor. At the same time, the small formats do occur with a certain frequency and thus the efficiency of the equipment is in need of improvement.

SUMMARY OF THE INVENTION

It is therefore an object of the invention to provide a method and an apparatus in which even when there is a great number of formats of sheets of the copy material (photographic paper), the paper stage is efficiently utilized. Thus, the efficiency of the overall equipment, especially with small formats, is markedly increased.

During the removal of the exposed single-sheet copy material, the next piece of unexposed single-sheet copy material is transported into the exposure beam path. In terms of apparatus, this is attained by a controller that controls the transport means in such a way that the transport means transports the next piece of unexposed single-sheet copy material into the exposure beam path while the exposed single-sheet copy material is being removed. In this way, the paper stage is used more efficiently, such as with photo paper formats that fill up only a small portion of the paper stage.

An especially advantageous feature of an exemplary method and apparatus according to the invention is that the exposed single-sheet copy material, after its removal, is handed over to a transfer means, which carries it to a downstream paper developing station. The transport speed is equal to or greater than the average speed corresponding to one cycle of transportation into the exposure beam path, exposure and removal. In terms of apparatus, transfer means are provided which are connected downstream of the transport means and to which the transport means hands over the exposed single-sheet copy material after its removal. These transfer means are in turn provided with transport means which hand over or transport the copy material at a transport speed that is equal to or greater than the average speed corresponding to the cycle described above.

Further variations are distinguished in that the unexposed copy material is furnished in the form of a strip and is cut to single-sheet format only just before being transported into the exposure beam path. In terms of apparatus, a memory for furnishing the unexposed copy material in the form of a strip is provided. There is also a cutting means for cutting the strip to single-sheet format only just before the transport of the copy material into the exposure beam path.

BRIEF DESCRIPTION OF THE DRAWINGS

The present invention can be further understood with reference to the following description and the appended drawings, wherein like elements are provided with the same reference numerals. In the drawings.

DETAILED DESCRIPTION OF THE PREFERRED EMBODIMENTS

Figure 1:
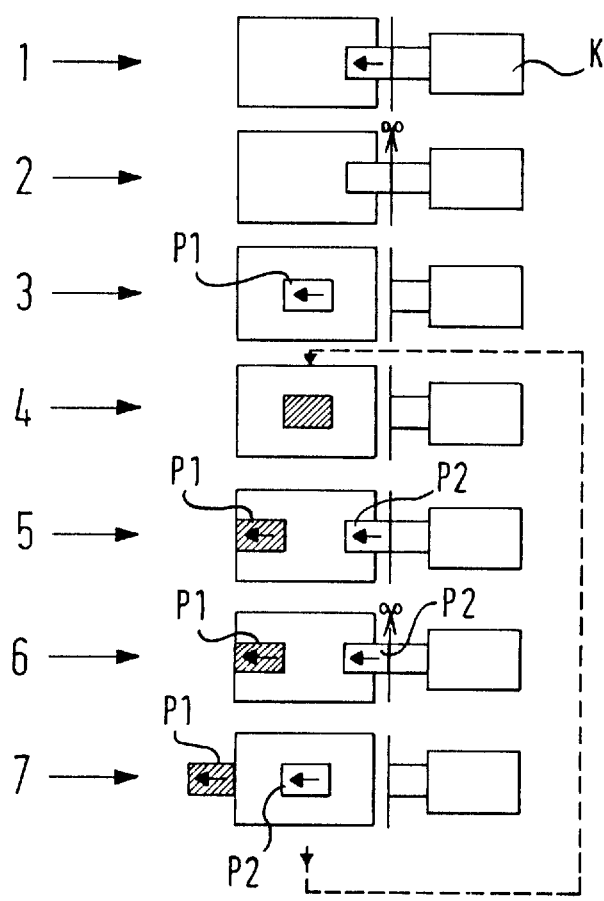
FIG. 1, in the form of a flow chart, shows an exemplary copying method according to the invention.

An exemplary method of the invention is illustrated by the flow chart in FIG. 1. In step 1, unexposed photo paper having the width of the desired format is extracted from a paper cassette K to the extent of the length of the desired format. The unexposed photo paper is stored in the paper cassette K in the form of a long strip. In step 2 following the extraction of the paper, the paper is cut into a first piece P1, and in step 3, P1 is transported into the copying beam path. In step 4, the desired negative is copied onto P1, or in other words the photo paper is exposed. Once the exposure has been completed, in step 5 the exposed P1 is removed. While removing exposed P1 in step 5, new unexposed photo paper is already being extracted again from the paper cassette K, to the length of the desired format. In step 6, the photo paper is cut into a second piece P2. While the exposed first piece P1 is leaving the paper stage in step 7, the following unexposed piece P2 is already being transported into the copying beam path. The second piece P2 is now exposed as well, in accordance with step 4, and the loop comprising the steps 4–7 is repeated continuously.

The method of FIG. 1 is shown and described for only one format of the piece of paper (the paper width and length are identical from one sheet of paper to another). Either by suitably replacing the cassette K or by means of a variation described hereinafter (crosswise transport of the appropriate format of the piece of paper to the paper stage using a carriage; see, for example, U.S. Pat. No. 5,335,045, equivalent to European Patent Disclosure EP-A 0 570 651, the contents of which are hereby incorporated by reference in their entireties), pieces of paper of other sizes (different paper width and length) can be processed. Nevertheless, in principle, the sequence remains the same.

Figure 2:
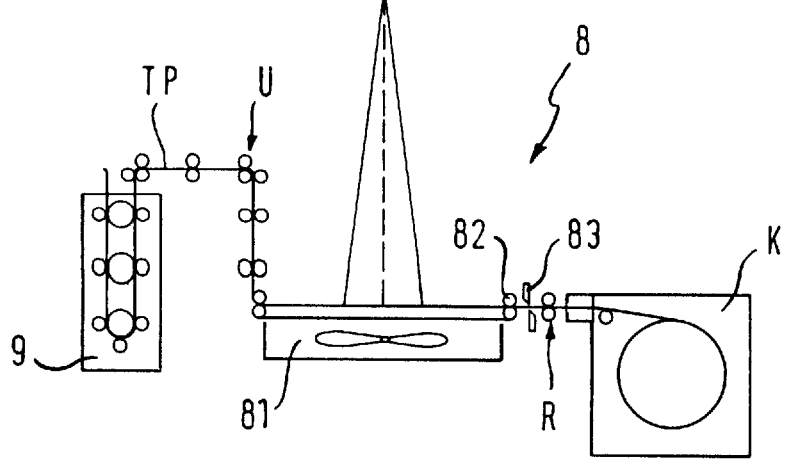
FIG. 2 shows a schematic of an exemplary embodiment of a copying apparatus according to the invention, with a downstream paper processor.

FIG. 2 shows an exemplary embodiment of a copying apparatus 8 according to the invention with a downstream paper processor 9. The copying apparatus 8 includes a film stage 80, on which the original is guided, and a paper stage 81, on which the pieces of paper are transported by transport means 82. Also visible are, on the input side, a paper cassette K, as well as cutting means 83, which cuts the unexposed photo paper, furnished in the form of a strip, into a piece having the desired format length. The unexposed photo paper furnished in the paper cassette K is held in a defined position between a pair of rollers R. On the output side, transfer means U are provided, which transport the exposed piece of paper P1 on the paper stage 81 (FIG. 1), and after its removal from the paper stage 81, to the paper processor 9, where the exposed piece of paper P1 is developed by wet chemical means. In FIG. 2, for the sake of better visibility, the transport path TP of the paper is shown in a continuous line, although in practice it will always be only individual single-sheet pieces of paper that are transported along this transport path TP.

Figure 3:
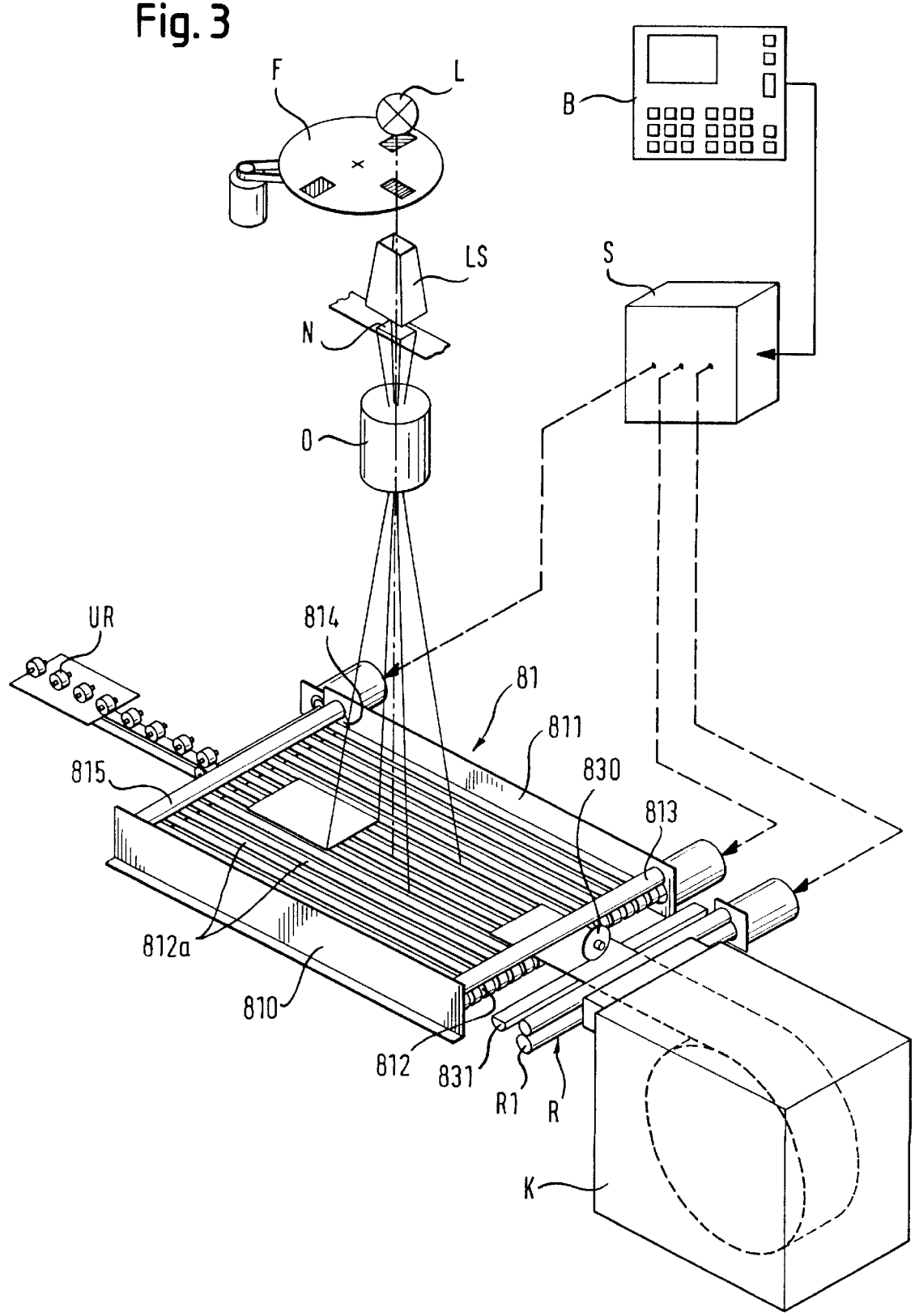
FIG. 3, in a perspective view, shows a variant embodiment of the essential parts of a printer according to the invention.

FIG. 3 shows the parts of an exemplary embodiment of a copying apparatus according to the invention sufficient for understanding aspects of the present invention, together with a paper cassette K which includes an unexposed photo paper in the form of a strip which is wound up into a roll. The paper is held in a position of repose between a pair of rollers R, of which the lower roller R1 can be driven by means of a controllable electric motor, so that when an appropriate control signal is received, paper can be extracted from the paper cassette K. In the further course of the transport path, a cutting means, for cutting the strip into individual pieces of paper of desired length, is symbolically indicated by a sharp-edged wheel 830 that is movable crosswise to the transport direction and by a support 831 with a corresponding edge.

In FIG. 3 a paper stage 81 can also be seen, which has two side walls 810 and 811, whose distance from one another defines the maximum width of the photo paper that can be used. The paper stage 81 also has transport means for the photo paper, which include rollers 812 and 813 located on the input side, of which the lower roller 812 can be driven by an electric motor. On the output side, rollers 814 and 815 are also provided, but they are not independently driveable. A plurality of conveyor belts 812a extending in the transport direction are wrapped around each lower roller 812 and 814, and the photo paper is transported on these belts as a consequence of the driving of the roller 812 by the electric motor.

Downstream of the output-side rollers 814 and 815, in terms of the transport direction, transfer means are provided, symbolized by a plurality of rollers UR. The rollers of the transfer means are driveable by an electric motor. The transport speed at which the transfer means U transport the photo paper onward after its removal from the paper stage 81 is at least as high as an average speed, corresponding to one timing cycle on the paper stage. The average speed with which the exposed photo paper is transported by the transfer means U is accordingly at least great enough that during one complete cycle on the paper stage, or in other words during the time in which one piece of paper is transported into the copying beam path, exposed, and removed, the piece of paper transferred to the transfer means is handed on or transported onward by at least the distance equivalent to the length of the maximum possible paper format that can be processed.

Also shown in FIG. 3, symbolically, are the elements of a printer that are sufficient for understanding aspects of the present invention. These include a copying light source L; a drivable filter wheel F, with three filters for exposure to blue, green and red light, a light shaft LS for guiding the light from the copying light source onto the negative N to be copied and a projection optical element O, whose enlargement scale is variable and which projects the negative onto the photo paper on the paper stage 81. For controlling the copying operation, a controller S is provided, as well as a control station B for manual intervention by an operator. B can also be used for inputting a particular format desired for a particular piece of paper.

The exemplary embodiment shown in FIG. 3 of an apparatus according to the invention functions essentially as follows: The controller S, which (either from an automatic readout or by manual input) knows which paper format is required generates a control signal. This signal causes the electric motor to drive the roller R1 in order to feed unexposed photo paper out of the paper cassette K to the desired length. Once this is completed, the paper feeding is stopped, and the controller S generates a cutting signal. In response, the sharp-edged wheel 830 is moved crosswise to the transport direction of the photo paper and the paper is cut to the desired format. This piece of paper, whose front region, in terms of the transport direction, has already reached a point between the input-side rollers 812 and 813, is then transported into the copying beam path upon the electric motor that drives the roller 812 receiving a corresponding signal from the controller S. Once the piece of paper has entered the copying beam path, the transport of paper on the paper stage 81 is stopped. The negative N is copied onto the piece of paper and the exposed piece of paper is removed. Removal is accomplished by the controller S generating a signal and sending it to the electric motor which drives the roller 812.

Simultaneously with the removal of the exposed piece of paper, unexposed photo paper is again extracted from the paper cassette K to the desired length. By the time the exposed piece of paper reaches the output end of the paper stage 81, the unexposed paper has been advanced by the rollers R by the desired length and is then cut to make the piece of the desired format (see steps 5 and 6 in FIG. 1). With the ensuing transport of the newly cut piece into the copying beam path, the exposed piece of paper is handed over to the transfer means U and transported onward, for instance to a paper processor 9 as shown in FIG. 2.

From the mode of operation described, one skilled in the art can immediately see that the paper stage is used substantially more efficiently than is the case in previously known equipment. The overall equipment is used more efficiently, since the throughput of copies is increased. The example described shows only two pieces of paper being transported simultaneously on the paper stage. The present invention also allows the pieces of paper to follow one another in very close succession (for example, with a separation of 10 mm or less between successive pieces of paper). In other words, while the preceding piece of paper is being transported into the copying beam path, the next piece of paper can already be cut off and transferred to the transport means of the paper stage. Hence a plurality of pieces of paper, in close succession, can all be located on the paper stage at the same time. Since the copying beam path is only slightly larger than the particular paper format desired, the piece of paper in the copying beam path is fully exposed, without the pieces of paper in the waiting positions being exposed.

As already noted, methods and corresponding equipment as described above can achieve especially efficient utilization, even when the formats change. In a simple way, a plurality of cassettes can be furnished for different paper widths to cut the paper of varying width to a desired length and to transfer the paper to a carriage, of the kind described in U.S. Pat. No. 5,335,045 (EP-A 0 570 651), that is displaceable crosswise to the transport direction. This carriage then transfers the paper to the transport means of the paper stage.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning and range and equivalence thereof are intended to be embraced therein.

What is claimed is:

1. A method for copying photographic originals onto unexposed single-sheet photographic copy material where the originals are scanned to obtain scanning values, a quantity of copying light needed for copying the original onto the single-sheet copy material being determined from the scanning values, said method comprising the steps of:

transporting an unexposed piece of a specific size of said single-sheet copy material onto an exposing stage on which pieces of various sizes of said single-sheet copy material can be exposed to the copying light;

transporting said piece on said exposing stage to a copying position appropriate for projecting said original onto said piece of specific size;

applying the quantity of copying light so that said piece of the copy material becomes an exposed piece of copy material; and removing the exposed piece from the exposing stage;

wherein the transporting of the unexposed piece onto said exposing stage and the removing of the exposed piece from said exposing stage is performed such that the exposed piece is still on the exposing stage when at least a portion of a next unexposed piece of single-sheet copy material has been transported onto the exposing stage.

2. The method according to claim 1 wherein the exposed copy material is handed over to a transfer means for transporting the exposed copy material to a downstream paper developing station at a speed that is at least equal to an average speed corresponding to one cycle of transportation into the exposure beam path, exposure and removal from the exposure beam path.

3. The method according to claim 1 wherein the unexposed copy material is stored as a strip and is cut to a single-sheet format prior to being transported into the exposure beam path.

4. An apparatus for copying photographic originals onto unexposed single-sheet photographic copy material where the originals are scanned to obtain scanning values, a quantity of copying light needed for copying the originals onto the single-sheet copy material being determined from the scanning values, said apparatus comprising:

transport means for transporting an unexposed piece of a specific size of said single-sheet copy material onto an exposing stage on which pieces of various sizes of said single-sheet copy material can be exposed to the copying light and to a copying position on the exposing stage that is appropriate for projecting said original onto said piece of specific size, and for removing the exposed piece from the exposing stage;

light application means for applying the quantity of copying light so that said piece of the copy material in said copying position becomes an exposed piece of copy material; and controlling means for controlling the transport means such that the transporting of the unexposed piece onto said exposing stage and the removing of the exposed piece from said exposing stage is performed such that the exposed piece is still on the exposing stage when at least a portion of a next unexposed piece of single-sheet copy material has been transported onto the exposing stage.

5. The apparatus of claim 4 wherein a transfer means removes the exposed copy material to a downstream paper developing station and transports the next piece of copy material at a speed that is at least equal to an average speed that corresponds to one cycle of transportation into the exposure beam path, exposure and removal from the beam path.

6. The apparatus of claim 4 further comprising:

a storage means for storing the unexposed copy material as a strip; and a cutting means for cutting the strip into single-sheet format at a location immediately preceding the transport means.

* * * * *